(12) United States Patent
Wada et al.

(10) Patent No.: US 9,582,837 B2
(45) Date of Patent: Feb. 28, 2017

(54) MANAGEMENT SYSTEM FOR GAS COCK OPENING AND CLOSING

(71) Applicant: Nippon Gas Co., Ltd., Tokyo (JP)

(72) Inventors: Shinji Wada, Tokyo (JP); Shingo Dekamo, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 14/763,770

(22) PCT Filed: Jan. 30, 2014

(86) PCT No.: PCT/JP2014/000502
§ 371 (c)(1),
(2) Date: Jul. 27, 2015

(87) PCT Pub. No.: WO2014/119326
PCT Pub. Date: Aug. 7, 2014

(65) Prior Publication Data
US 2015/0363896 A1  Dec. 17, 2015

(30) Foreign Application Priority Data

Jan. 31, 2013 (JP) ................................. 2013-017798

(51) Int. Cl.
*G01R 11/56* (2006.01)
*G06Q 50/06* (2012.01)
(Continued)

(52) U.S. Cl.
CPC ....... *G06Q 50/06* (2013.01); *G06F 17/30879* (2013.01); *G06Q 10/20* (2013.01);
(Continued)

(58) Field of Classification Search
None
See application file for complete search history.

(56) References Cited

U.S. PATENT DOCUMENTS 4,132,981 A * 1/1979 White ................ G01D 4/006
340/10.34
5,042,528 A * 8/1991 England ............. F17C 13/00
137/605

(Continued)

FOREIGN PATENT DOCUMENTS

| JP | 2004157635 | 6/2004 |
|----|------------|--------|
| JP | 2006244287 | 9/2006 |
| JP | 2010198275 | 2/2009 |

OTHER PUBLICATIONS

The International Preliminary Report on Patentability mailed Aug. 13, 2015 for PCT application No. PCT/JP2014/000502, 6 pages.

*Primary Examiner* — Ryan Zeender
*Assistant Examiner* — Christopher Buchanan
(74) *Attorney, Agent, or Firm* — Lee & Hayes, PLLC

(57) ABSTRACT

A communication terminal receives acceptance data for gas cock opening created by a server, performs selection based on the received acceptance data, reads a two-dimensional barcode, and compares two-dimensional barcode data and target data stored in a storage device of the communication terminal; the sever sends the communication terminal a gas inspection item in which the target data is reflected; the communication terminal receives the inspection item in which the target data is reflected, checks an inspection result item created for the inspection item, and sends the checked inspection result item to the server; and the server gives permission for the gas cock opening based on the sent inspection result item, and sends a result of the permission to the communication terminal.

2 Claims, 25 Drawing Sheets

(51) Int. Cl.
  *G06Q 10/00* (2012.01)
  *G06F 17/30* (2006.01)
  *G06Q 30/00* (2012.01)
  *G06Q 30/04* (2012.01)
  *G07C 9/00* (2006.01)

(52) U.S. Cl.
  CPC .......... *G06Q 30/018* (2013.01); *G06Q 30/04* (2013.01); *G07C 9/00103* (2013.01)

(56) References Cited

U.S. PATENT DOCUMENTS

| | | | | |
|---|---|---|---|---|
| 5,146,067 A | * | 9/1992 | Sloan | G06Q 20/3437 235/381 |
| 5,243,654 A | * | 9/1993 | Hunter | G06Q 20/401 380/51 |
| 2003/0054640 A1 | * | 3/2003 | Tamata | B01D 53/68 438/689 |
| 2009/0307117 A1 | * | 12/2009 | Greiner | G06Q 20/145 705/34 |
| 2012/0101910 A1 | * | 4/2012 | Neri-Badillo | G01D 4/00 705/18 |

* cited by examiner d220

COCK CLOSING INPUT
(UNPAID BILL COCK CLOSING INPUT)

BILL CALCULATION

| | |
|---|---|
| d221 — CUSTOMER NAME | ○○CUSTOMER○○ |
| PAYMENT CLASSIFICATION | BANK |
| PAYMENT METHOD FOR COCK CLOSING | CONVENIENCE STORE OR POST OFFICE TRANSFER |
| PAYMENT DUE DATE | 2001/01/01 |
| d222 — NUMBER OF DAYS OF PAYMENT BY DAY | 99 |
| d223 — USAGE | 888.8 |
| BILL (TAX INCLUDED) | |

FIG.22

MANAGEMENT SYSTEM FOR GAS COCK OPENING AND CLOSING

TECHNICAL FIELD

The present invention relates to a system for managing gas cock opening and gas cock closing related to gas sales.

BACKGROUND ART

LP gas cock opening and closing starts when any one of a customer/consumer, a management company or a real estate manager of a facility applies for the gas cock opening or closing by telephone, a cell phone, the Web or by directly visiting a sales office of a gas supply company. The gas cock opening refers to installing a gas meter, a gas cylinder, and other components, and connecting them in order to supply gas, generated by vaporizing the LP gas, to the consumer through a pipeline. The sales office receives the application for opening/closing the gas cock. In the gas cock opening, a worker of the sales office or a worker of a construction company ordered by the sales office visits the consumer to attach the meter and install the gas cylinder and equipment required for gas supply. Moreover, a staff of the sales office in charge performs inspection before the gas cock opening, and determines whether to open the gas cock based on the result of the inspection.

When opening/closing the gas cock opening or closing, the sales staff performs required inspection and creates documents related to the inspection such as a contract document or a disconnection document. Then, the sales staff performs work associated with a gas contract or gas disconnection, such as the gas cock opening or closing work, creation of a form related to the gas cock opening or closing work, negotiation for newly installing a gas facility, and negotiation for gas switching. The inspection in the gas cock opening is required for the gas cock opening and performed by the sales staff before the gas cock opening. For example, the sales staff determines whether safety is ensured in supplying the gas, and whether the meter is not in an expired state and makes similar determinations. When the result indicates that the meter is expired, the meter is replaced with a new one.

However, there are problems in sales staff' creation of the contract document, the disconnection document, and the documents related to the inspection in the gas cock opening. Since the sales staff creates the documents by handwriting on paper or inputs document contents into a system at the sales office after returning from a site, a delay problem may occur to update customer data, or a work error may occur in an inspection method and inspection contents which vary depending on facility information and a gas supply mode.

SUMMARY OF INVENTION

Technical Problem

The present invention has been made under such circumstances, and provides a gas cock opening closing system which allows a sales staff to promptly handle all work related to gas cock opening and closing, with only a mobile terminal, while remaining at a site where the work for the gas cock opening and closing is performed.

Solution to Problem

In order to achieve such an object, the present invention provides a gas cock opening management system characterized in that: the gas cock opening management system comprises a server and a communication terminal; the communication terminal receives acceptance data for gas cock opening created by the server, performs selection based on the received acceptance data, reads a two-dimensional barcode attached to a meter, and compares two-dimensional barcode data and target data stored in a storage device of the communication terminal; the sever sends the communication terminal a gas inspection item in which the target data is reflected; the communication terminal receives the inspection item in which the target data is reflected, checks an inspection result item created for the inspection item, and sends the checked inspection result item to the server; and the server gives permission for the gas cock opening, based on the sent inspection result item, and sends a result of the permission to the communication terminal.

Advantageous Effects of Invention

According to the present invention, an input result and a form which are related to the gas cock opening work or the gas cock closing work can be printed when a sales staff related to gas sales performs the gas cock opening or gas cock closing on a site.

BRIEF DESCRIPTION OF DRAWINGS

FIG. 22 is a view showing an example of the display screen of the mobile terminal 105 in a breakdown of the bill calculation in the second embodiment of the present invention;

DESCRIPTION OF EMBODIMENTS

A schematic configuration of a system in the embodiment is described below. The system is for supporting a sales staff related to gas sales when the sales staff performs gas cock opening work or gas cock closing work on a site.

Figure 1:
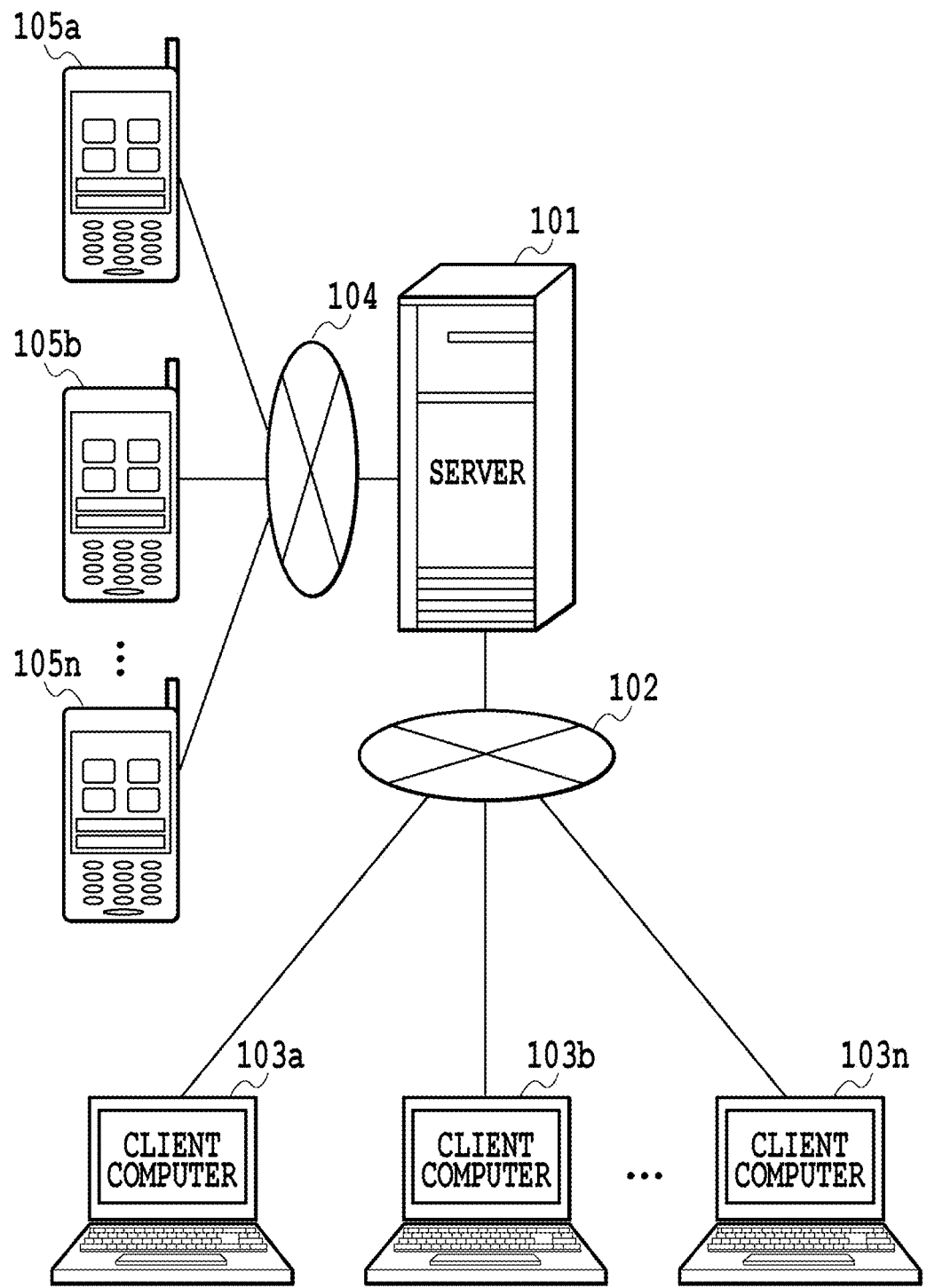
FIG. 1 is a view showing a network configuration example in one embodiment of the present invention.

FIG. 1 is a view showing an example of a network configuration in one embodiment of the present invention. In FIG. 1, a server (gas cock opening closing management system) 101 is configured to be capable of communicating with multiple client computers 103a, 103b, . . . , 103n via a network 102. The server 101 is also configured to be capable of communicating with multiple mobile terminals (communication terminals) 105a, 105b, . . . , 105n via a network 104. Note that, in the description common to the multiple client computers 103a to 103n, the client computers are simply referred to as client computers 103. Moreover, in the description common to the multiple mobile terminals 105a to 105n, the mobile terminals are simply referred to as mobile terminals 105.

For example, the client computer 103 is installed in a delivery center which centrally manages delivery bases, and is a terminal used by a user in the delivery center. The user connects to the server 101 via the client computer 103 and dedicatedly performs delivery operations such as checking of delivery status and giving instructions for creating delivery data. Note that the installation location of the client computer 103 may be the delivery base or the like, for example.

The mobile terminal 105 is used by a worker (for example, people including a meter reader, a deliveryman, a safety inspector, and the like) who check meter indication of a gas meter attached to a supply facility including a gas cylinder. The mobile terminal 105 includes a CPU, a memory, an input device, a display device, and the like. The worker collects meter indication data including meter indication of the gas meter and sends the meter indication data to the server 101 through the mobile terminal 105. Cases where the meter indication data is sent to the server 101 include, for example, times of meter reading, gas cock opening and closing, safety inspection, delivery of the gas cylinder, replacement of the gas meter, and the like.

[Configuration of Server]

Figure 2:
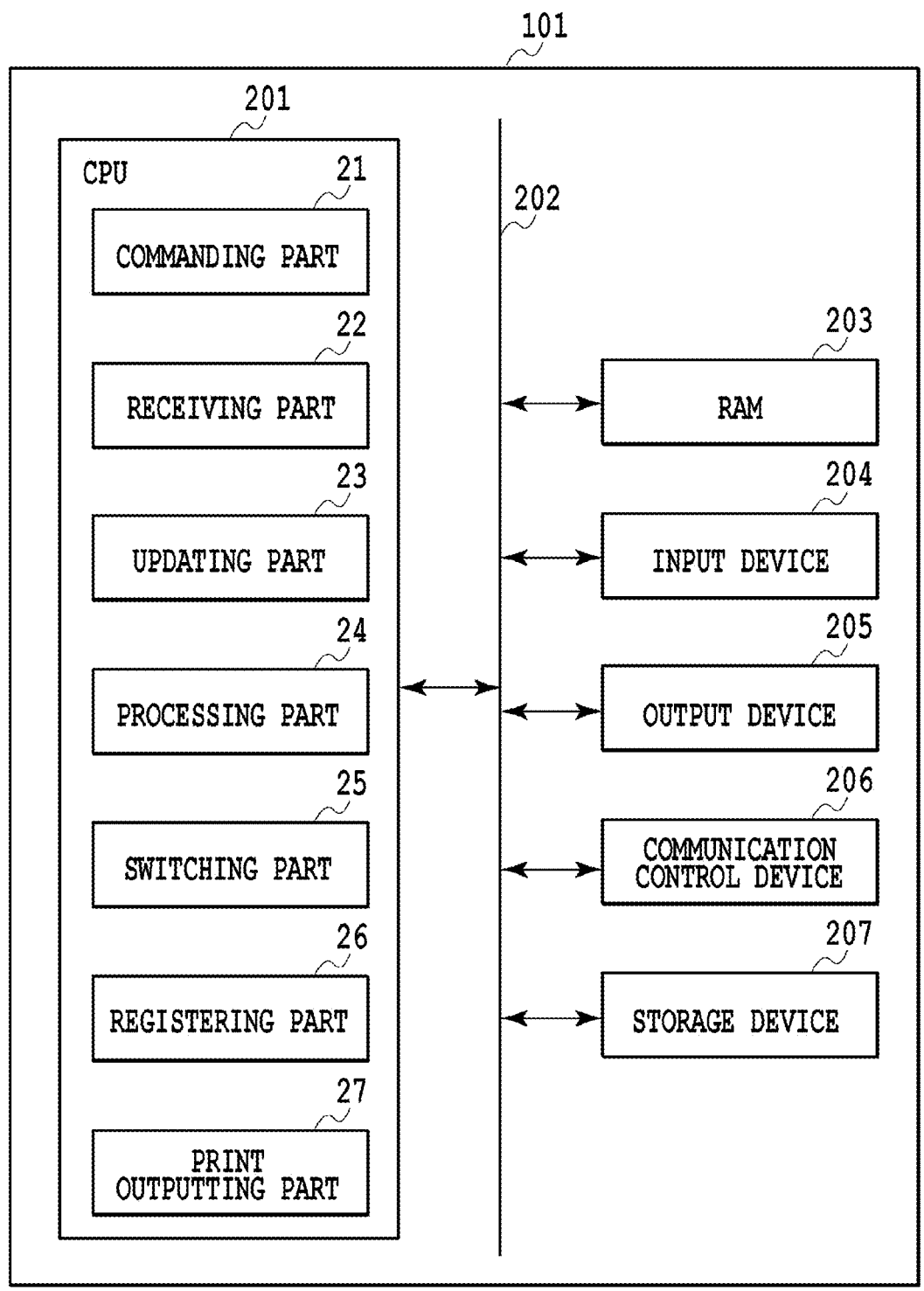
FIG. 2 is a block diagram showing a configuration example of a server 101 in a first embodiment of the present invention.

FIG. 2 is a block diagram showing a configuration example of the server 101. Note that, although a case where a single computer system is employed as the server 101 is described in FIG. 2, the server 101 may be configured as a part of a multi-function distributed system formed of multiple computer systems.

As shown in FIG. 2, the server 101 has a CPU 201, a system bus 202, a RAM 203, an input device 204, an output device 205, a communication control device 206, and a storage device (management part) 207.

The CPU 201 is connected to the other component parts via the system bus 202 and performs transfer processing of control signals and data, and also performs execution of various software programs, calculation processing, and the like for implementing operations of the entire server 101.

A work area for temporarily storing data and software programs is provided in the RAM 203.

The storage device 207 is formed by a non-volatile storage medium such as a ROM or a HDD, and includes a program storage region for storing software programs and data storage region for storing data which is obtained as needed, data which is a processing result, and the like. For example, the software programs are read out from the program storage region of the storage device 207 to the work area of the RAM 203 and are executed by the CPU 201, and the CPU 201 of the embodiment thereby implements functions of parts 21 to 27 or parts 131 to 137 to be described later.

First Embodiment

As shown in FIG. 2, the CPU 201 in the first embodiment of the present invention includes a commanding part 21, a receiving part 22, an updating part 23, a processing part 24, a switching part 25, a registering part 26, and a print outputting part 27.

The commanding part 21 sends a command instructing gas cock opening inspection to the mobile terminal 105 of the sales staff. The command instructing gas cock opening inspection is a command given from the server 101 after application data for gas cock opening from a customer is inputted into the server 101 by a keypad input or the like. A sales staff to be in charge of the gas cock opening inspection is determined based on the application data for the cock opening from the customer.

The receiving part 22 receives a result of the gas cock opening inspection sent by the sales staff from the mobile terminal 105. In the gas cock opening inspection, for example, when the meter is expired, determination is made that meter replacement is required. When the meter is not expired or when the meter replacement is already completed and a state of gas cock closing before the gas cock opening is one of new-contract vacant, move-out cock closing, unpaid bill cock closing, and safety cock closing, determination is made that a gas cock opening condition is satisfied. The new-contract vacant refers to a case where a gas meter, a gas cylinder, and the like are newly installed and cock opening is performed, a case where cock opening is performed due to switching of gas, and similar cases. The move-out cock closing refers to cock closing performed with moving-out due to gas disconnection. The unpaid bill cock closing refers to cock closing performed due to an unpaid gas bill, and the safety cock closing refers to cock closing which needs to be performed for safety check. The determination result is sent to the mobile terminal 105 of the sales staff.

The updating part 23 receives data read from a two-dimensional barcode attached to the meter, the data being read by the sales staff with the mobile terminal 105. In this description, the data read from the two-dimensional barcode attached to the meter is also referred to as two-dimensional barcode data, and the server 101 obtains a consumer code by using, as a search key, a meter company number extracted from the two-dimensional barcode data, for example. The sales staff reads the two-dimensional bar code attached to the meter by using the mobile terminal 105 to register customer information. The read two-dimensional barcode data includes, for example, the meter company number. Moreover, the consumer code can be linked to the meter company number. The read two-dimensional barcode data is sent to the server 101. Performing the data input for the customer information data by using the two-dimensional barcode which is attached to the meter and which is sent to the server 101 can link the inputted customer information data to the consumer code.

The processing part 24 performs customer information registration processing based on the two-dimensional barcode data read by the mobile terminal 105 and received by the updating part 23. The customer information is, for example, breakdown data generated based on a customer code and the like which are linked to the customer code linked to the data included in the two-dimensional barcode attached to the meter. In this case, the breakdown data includes the customer code, the full name, the telephone number, the cell phone number, the bill code, the reason of gas cock opening, and the like. Display of the reason for gas cock opening herein is display corresponding to a previous state of the consumer, and "normal cock opening" is displayed on a screen of the mobile terminal 105 when the state of gas cock closing before the gas cock opening is the new-contract vacant or the move-out cock closing. Cock re-opening" is displayed on the screen when the state of gas cock closing before the gas cock opening is the unpaid bill cock closing or the safety cock closing. The generated breakdown data is displayed in the mobile terminal 105 as contents of the customer information registration processing. The sales staff checks the displayed breakdown data, and when the sales staff presses a registration button, the customer information is registered. The customer information is reflected in a form related to the gas cock opening, by the customer information registration. When the state of gas cock closing before the gas cock opening is the new-contract vacant or the move-out cock closing ("normal cock opening"), the customer information linked to the consumer code does not exist from the first place, and the customer information is thus inputted by the sales staff. The inputted customer information is sent from the mobile terminal 105 to the server 101 and is linked to the consumer code in the server 101. When the state of gas cock closing before the gas cock opening is the unpaid bill cock closing or the safety cock closing ("cock re-opening"), the customer information linked to the consumer code exists in the server 101 in advance.

The switching part 25 performs switching to other functions related to the gas cock opening work and causes a function to which the switching part 25 has performed switching to be exhibited. The other functions related to the gas cock opening work are provided to efficiently perform work related to the gas cock opening, and the sales staff can perform switching by using the mobile terminal. The other functions related to the gas cock opening work refer to, for example, a meter replacement function, a safety inspection function, an alarm attachment function, and the like.

The registering part 26 registers gas cock opening information, based on data subjected to the customer registration processing in the processing part 24. Acceptance of the gas cock opening is completed by the gas cock opening information registration.

The print outputting part 27 creates gas cock opening form data used to print a document (also referred to as form) required for the gas cock opening, based on the gas cock opening information and the like, and sends a print instruction to the mobile terminal 105.

As described above, cooperation of the parts 21 to 27 of the server 101 and the mobile terminal 105 allows the sales staff to promptly handle all works related to the gas cock opening with only the mobile terminal.

[Operation of Server]

An operation of the system including the server 101 in the embodiment of the present invention is described below with reference to the drawings. Contents displayed on the screen of the mobile terminal 105 in the drawings show the case where the state of gas cock closing before the gas cock opening is the new-contract vacant or the move-out cock closing, i.e. the gas cock opening reason is "normal cock opening," unless otherwise noted.

The command instructing the gas cock opening inspection is given from the server 101 after the application data for the gas cock opening from the customer is inputted to the server 101 by the keypad operator or the like.

Figure 3:
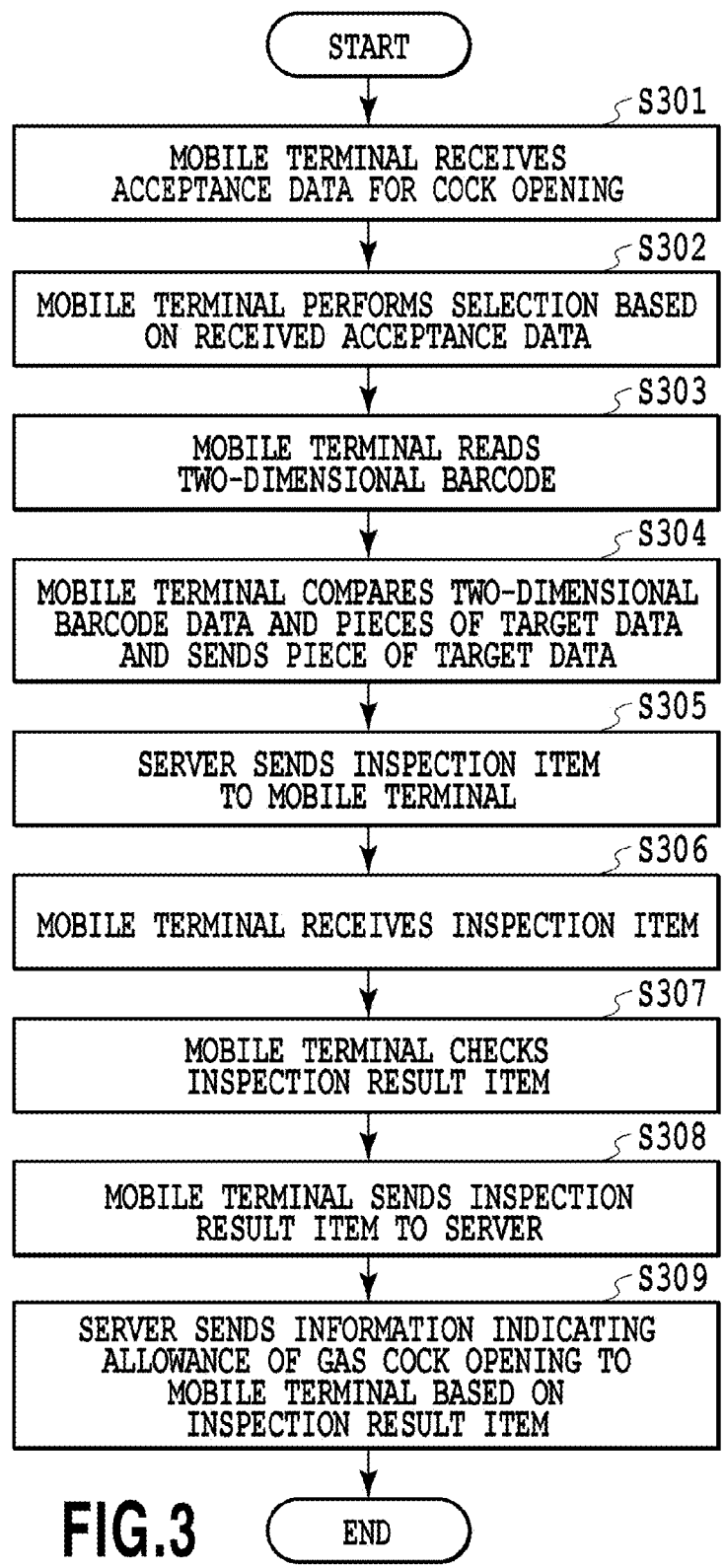
FIG. 3 is a flowchart showing an overall operation example of a system including the server 101 in the first embodiment of the present invention.

An example of an overall operation of the system including the server 101 is now described. FIG. 3 is a flowchart showing the example of the overall operation of the system including the server 101.

First, the mobile terminal 105 receives acceptance data for the cock opening created by the server 101 (S301), performs selection based on the received acceptance data (S302), and reads the two-dimensional barcode attached to the meter (S303). The aforementioned acceptance data is, for example, a list including pieces of data of cock opening scheduled people who are scheduled to have the cock opened. In S302, for example, the mobile terminal 105 selects a piece of data of a cock opening scheduled person which is to be the processing target, from the list.

Next, the mobile terminal 105 compares the two-dimensional barcode data and pieces of target data (multiple pieces of data of customers) stored in advance in a storage device of the mobile terminal 105 and sends a matching piece of target data to the server 101 (S304).

The server 101 sends the mobile terminal 105 a gas inspection item in which the aforementioned target data is reflected (S305). The mobile terminal 105 receives the inspection item in which the aforementioned target data is reflected (S306), checks an inspection result item created for the inspection item (for example, performs good or bad check for the inspection item) (S307), and sends the checked inspection result item to the server 101 (S308).

The server 101 gives permission for the gas cock opening based on the sent inspection result item, and sends information indicating permission for the gas cock opening to the mobile terminal 105 (S309). For example, when the check result is "good" for the inspection result item in S307, the server 101 gives permission for the gas cock opening.

Figure 4:
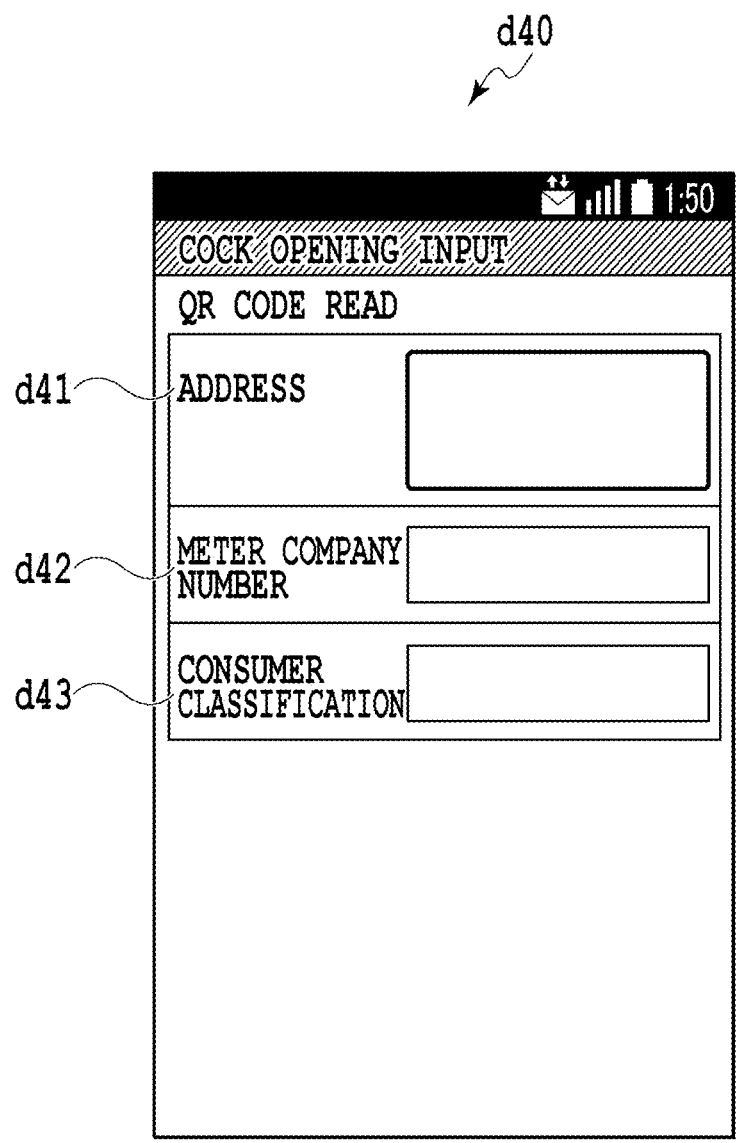
FIG. 4 is a view showing an example of an operation screen of a mobile terminal 105 before and after reading of a two-dimensional barcode in the first embodiment of the present invention.
Figure 5:
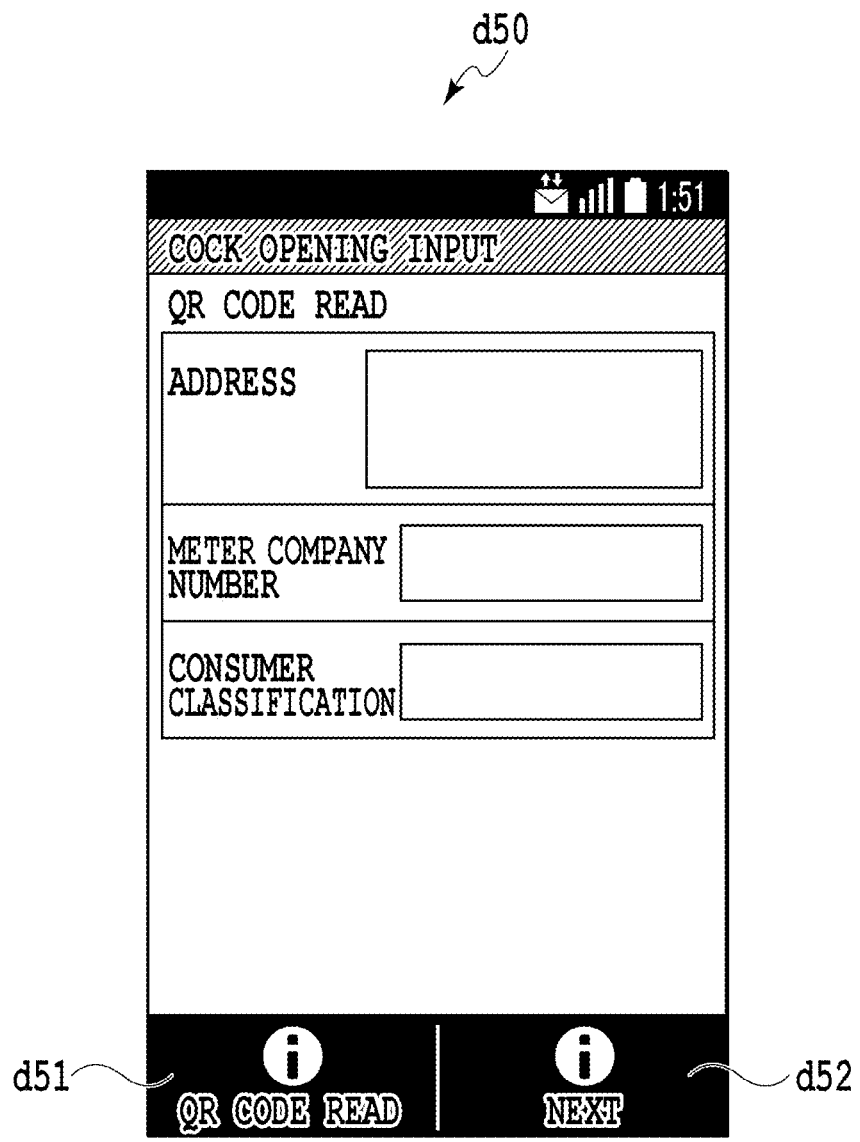
FIG. 5 is a view showing an example of the operation screen of the mobile terminal 105 before and after the reading of the two-dimensional barcode in the first embodiment of the present invention.
Figure 6:
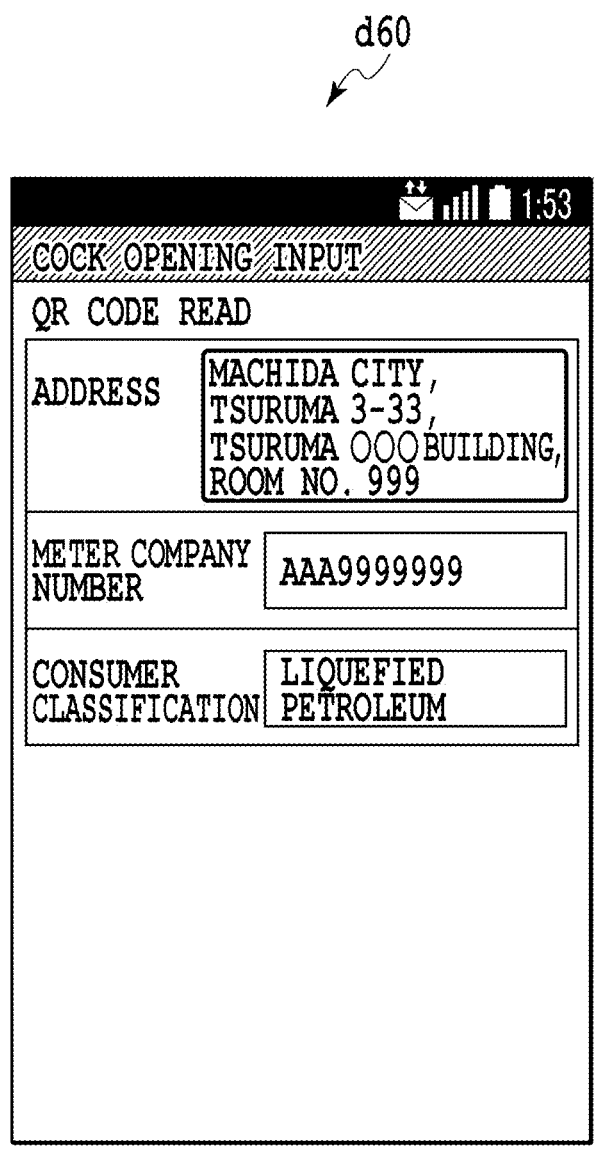
FIG. 6 is a view showing an example of the operation screen of the mobile terminal 105 before and after the reading of the two-dimensional barcode in the first embodiment of the present invention.
Figure 7:
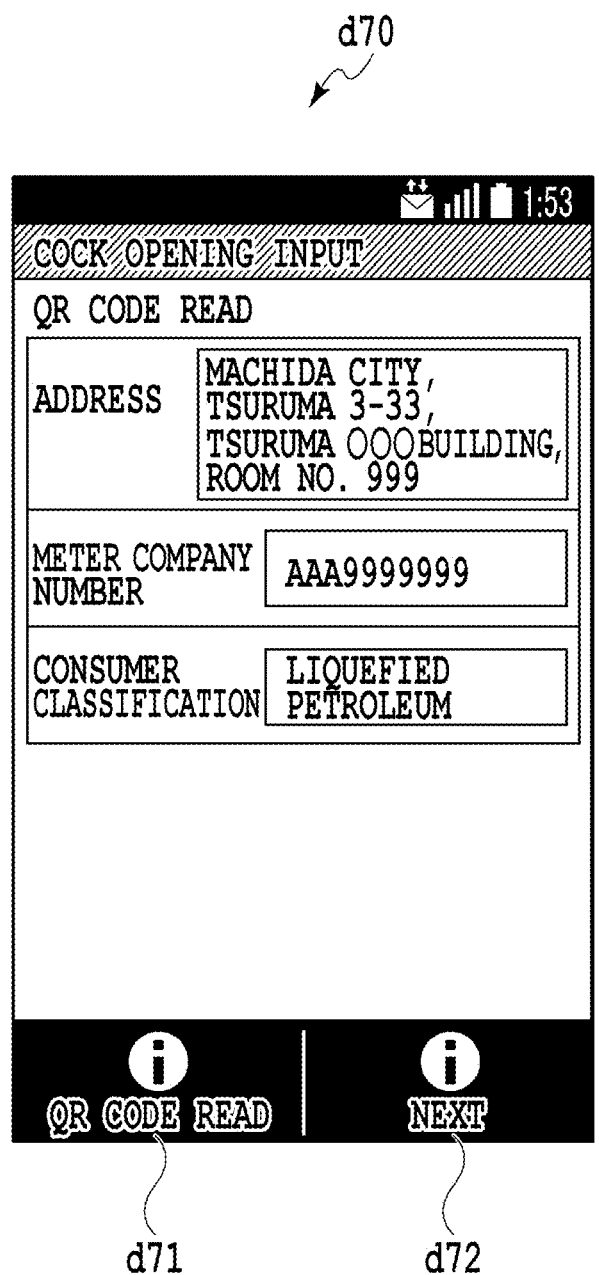
FIG. 7 is a view showing an example of the operation screen of the mobile terminal 105 before and after the reading of the two-dimensional barcode in the first embodiment of the present invention.

FIGS. 4 to 7 show examples of an operation screen of the mobile terminal 105 before and after the reading of the two-dimensional barcode. FIG. 4 shows an example d40 of the operation screen of the mobile terminal 105 before the reading of the two-dimensional barcode attached to the meter, and FIG. 5 shows an example d50 of the operation screen of the mobile terminal 105 before the reading of the two-dimensional barcode attached to the meter. FIG. 6 shows an example d60 of the operation screen of the mobile terminal 105 after the reading of the two-dimensional barcode attached to the meter, and FIG. 7 shows an example d70 of the operation screen of the mobile terminal 105 after the reading of the two-dimensional barcode attached to the meter. FIGS. 4 and 6 each show an example of the screen before pressing of a menu button of the mobile terminal 105, and FIGS. 5 and 7 each show an example of the screen after the pressing of the menu button of the mobile terminal 105. The operation screen d50 of the mobile terminal 105 shown in FIG. 5 includes, for example, a "QR code (registered trademark) read" button d51 and a "next" button d52. The operation screen d70 of the mobile terminal 105 shown in FIG. 7 includes, for example, a "QR code (registered trademark) read" button d71 and a "next" button d72.

As shown in FIGS. 4 to 7, the operation screen displayed in the case of the reading of the two-dimensional barcode attached to the meter is includes, for example, an "address" d41, a "meter company number" d42, a "consumer classification" d43, and the like. The "address" d41, the "meter company number" d42, and the "consumer classification" d43 can be linked to the consumer code included in the data stored in the storage device 207 of the server 101 by the reading of the two-dimensional barcode attached to the meter.

For example, when the sales staff has read the two-dimensional barcode attached to the meter, the sales staff switches the operation screen to a "gas cock opening input (customer information)" screen (see FIGS. 8 to 10) by selecting the "next" button d72.

Figure 8:
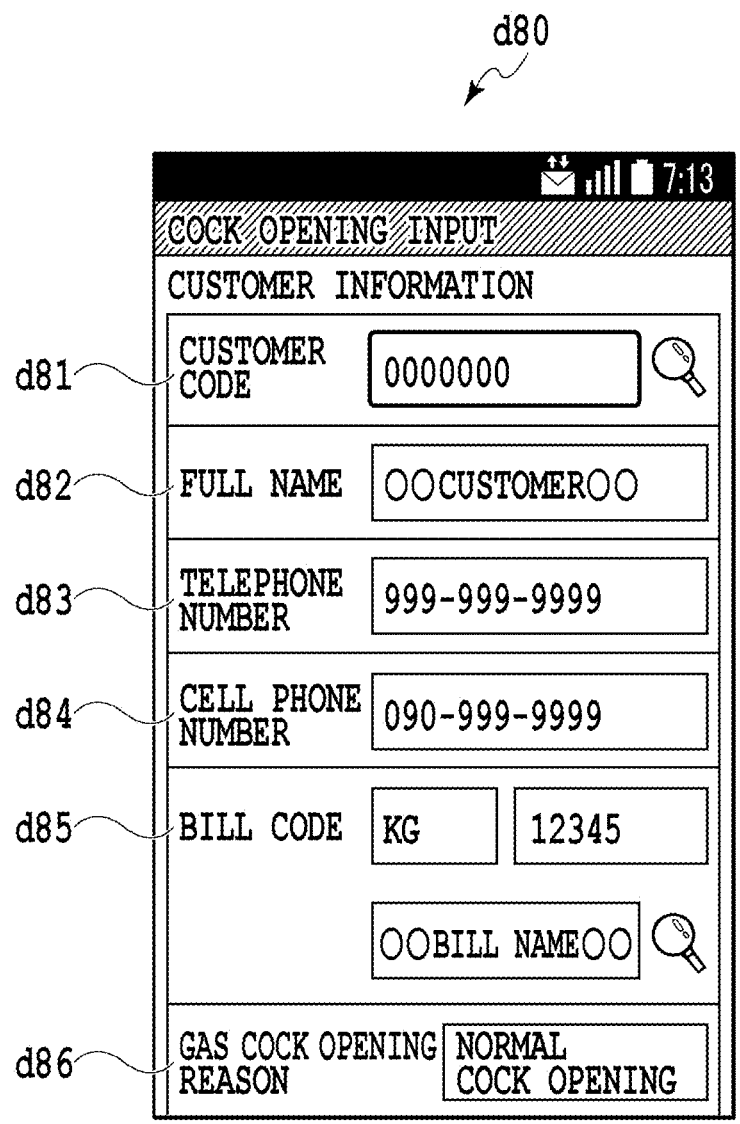
FIG. 8 is a view showing an example of a display screen of the mobile terminal 105 in registration of customer information in the first embodiment of the present invention.
Figure 9:
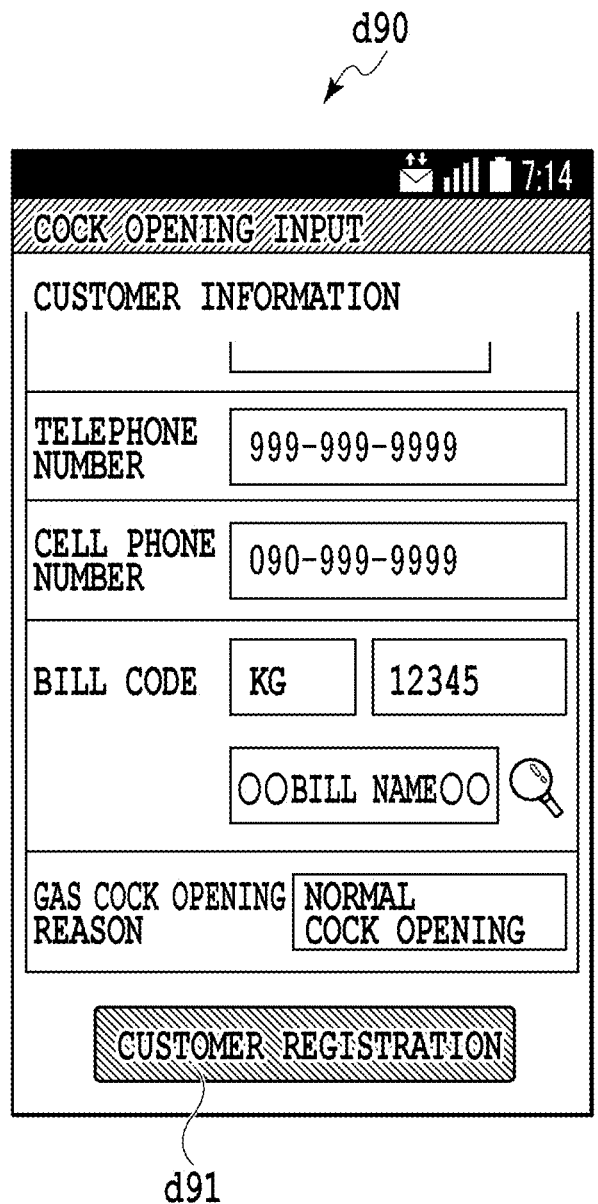
FIG. 9 is a view showing an example of the display screen of the mobile terminal 105 in the registration of the customer information in the first embodiment of the present invention.
Figure 10:
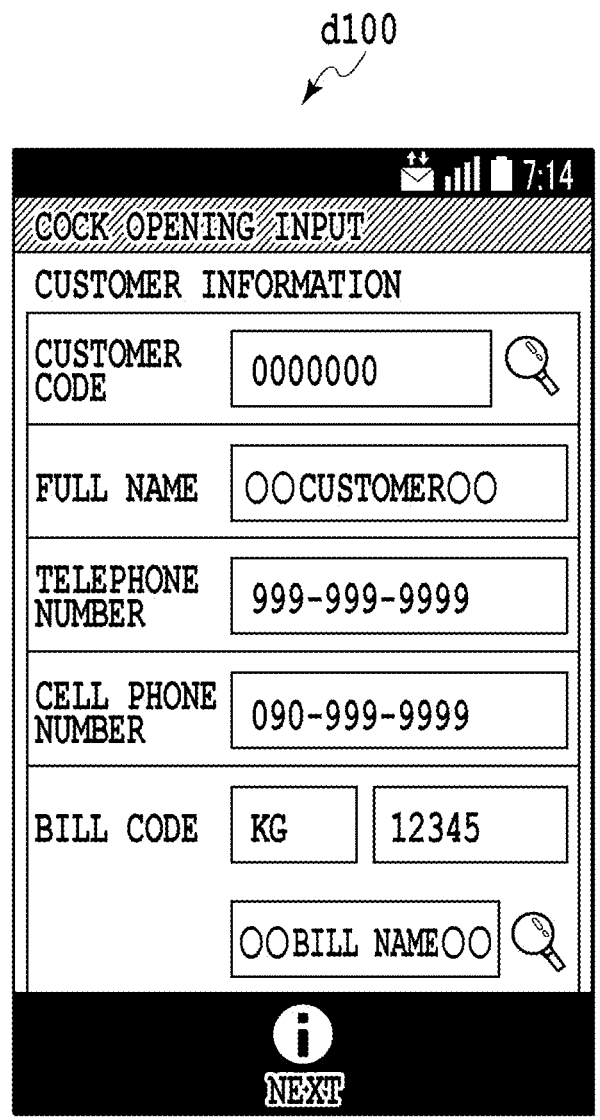
FIG. 10 is a view showing an example of the display screen of the mobile terminal 105 in the registration of the customer information in the first embodiment of the present invention.

FIGS. 8 to 10 each show an example of a display screen of the mobile terminal 105 in the registration of the customer information. FIG. 8 shows an example d80 of the screen before the pressing of the menu button of the mobile terminal 105 and before scrolling, FIG. 9 shows an example d90 of the screen before the pressing of the menu button of the mobile terminal 105 and after scrolling toward a lower side of the screen, and FIG. 10 shows an example d100 of the screen after the pressing of the menu button of the mobile terminal 105.

The processing part 24 of the server 101 performs the customer information registration processing, based on the two-dimensional barcode data which is read by the mobile terminal 105 and which is received by the updating part 23. The customer information is, for example, breakdown data generated based on the customer code and the like which are linked to the consumer code linked to the data included in the two-dimensional barcode. The generated breakdown data is displayed on the mobile terminal 105 as contents of the customer information registration processing. The sales staff checks the displayed breakdown data and, when the sales staff presses the registration button, the customer information is registered. The customer information is reflected in the form related to the gas cock opening by the customer information registration. In the case of the new-contract vacant or the move-out cock closing ("normal cock opening"), the customer information linked to the consumer code does not exist from the first place, and the customer information is thus inputted by the sales staff. The inputted customer information is sent from the mobile terminal 105 to the server 101, and then linked to the consumer code in the server 101. When the state of gas cock closing before the gas cock opening is the unpaid bill cock closing or the safety cock closing ("cock re-opening"), the customer information linked to the consumer code exists in the server 101 in advance. As shown in FIGS. 8 to 10, the operation screen displayed in the case of the customer information registration includes, for example, a "customer code" d81, a "full name" d82, a "telephone number" d83, a "cell phone number" d84, a "bill code" d85, a "gas cock opening reason" d86, and the like. The "customer code" d81 and the "bill code" d85 can be linked to the consumer code included in the data stored in the storage device 207 by the reading of the two-dimensional barcode attached to the meter. Furthermore, the "full name" d82, the "telephone number" d83, and the "cell phone number" d84 can be linked to the "customer code" d81. Pressing a "customer registration" button d91 on the screen calls the gas cock opening information registration processing (see FIGS. 11 and 12). When no customer information is registered, an error message is displayed.

Figure 11:
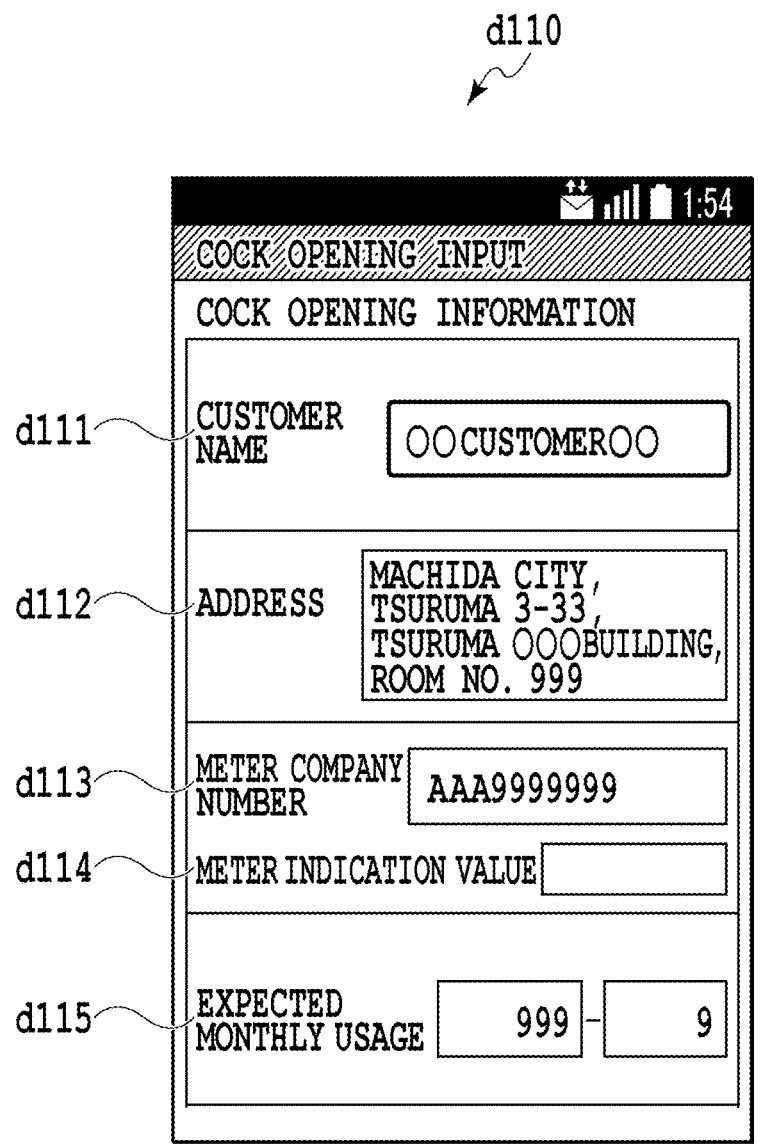
FIG. 11 is a view showing an example of the display screen of the mobile terminal 105 in registration of gas cock opening information in the first embodiment of the present invention.
Figure 12:
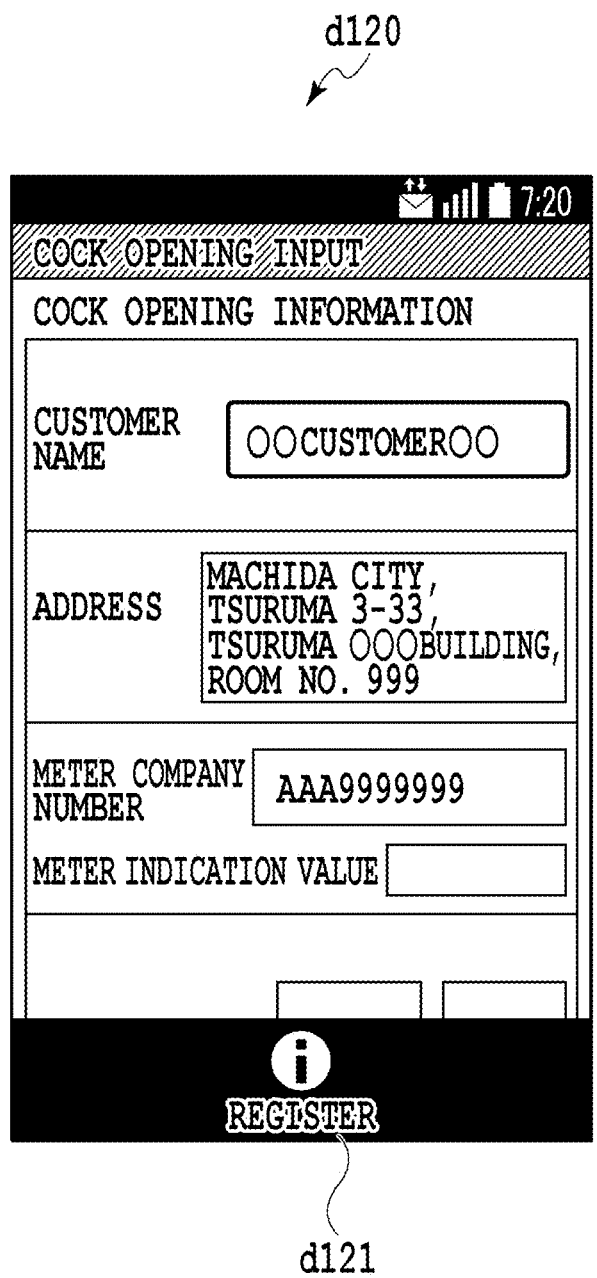
FIG. 12 is a view showing an example of the display screen of the mobile terminal 105 in the registration of the gas cock opening information in the first embodiment of the present invention.

FIGS. 11 and 12 each show an example of the display screen of the mobile terminal 105 in which the gas cock opening information is displayed. FIG. 11 is an example d110 of the screen before the pressing of the menu button of the mobile terminal 105. FIG. 12 shows an example d120 of the screen after the pressing of the menu button of the mobile terminal 105.

The registering part 26 of the server 101 performs registration of the gas cock opening information, based on the data subjected to the customer registration processing in the processing part 24. As shown in FIGS. 11 and 12, the operation screen of the mobile terminal 105 displayed in the case of the gas cock opening information registration includes, for example, a "customer name" d111, an "address" d112, a "meter company number" d113, a "meter indication value" d114, an "expected monthly usage" d115, and the like. The "customer code" d81, the "customer name" d111, and the "meter company number" d113 are already linked to the consumer code stored in the storage device 207 of the server 101 by the reading of the two-dimensional barcode attached to the meter, and data thereof are automatically detected and displayed on the screen of the mobile terminal 105 without performing data input. When the sales staff presses a "register" button d121, the registering part 26 of the server 101 performs the gas cock opening information registration processing. When the state of gas cock closing before the gas cock opening is the unpaid bill cock closing or the safety cock closing ("cock re-opening"), for example, input into items such as the meter indication value, the expected monthly usage, and the like may be disabled.

The print outputting part 27 of the server 101 creates the gas cock opening form data used to print the document required for the gas cock opening, based on the gas cock opening information and the like, and sends the print instruction to the mobile terminal 105. The sales staff operates the mobile terminal 105 upon receiving the print instruction to cause a print outputting device to print the gas cock opening form. The form related to the gas cock opening is a document for notifying the customer of the gas cock opening, and includes, for example, the date and time of the cock opening. The printing can be performed by a mobile printer or the like.

As described above, automatic creation of the data required for the cock opening allows the sales staff to perform input of the data required for the cock opening and printing of the form on the site by using the mobile terminal 105.

Second Embodiment

[Configuration of Server]

Figure 13:
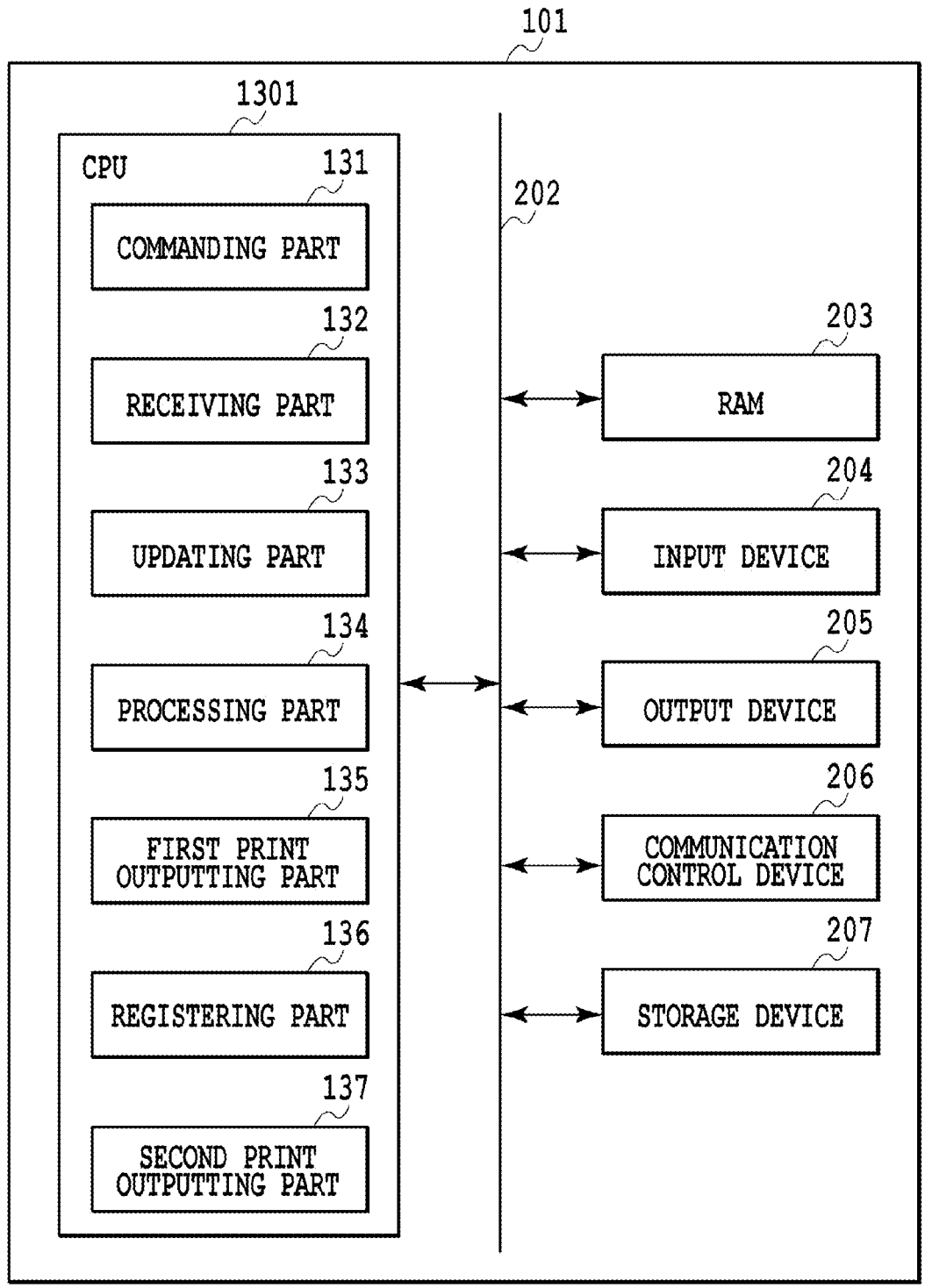
FIG. 13 is a block diagram showing a configuration example of a server 101 in a second embodiment of the present invention.

As shown in FIG. 13, a CPU 1301 in a second embodiment of the present invention includes a commanding part 131, a receiving part 132, an updating part 133, a processing part 134, a first print outputting part 135, a registering part 136, and a second print outputting part 137. Each screen of a mobile terminal 105 is a screen displayed in data input for cock closing.

The commanding part 131 sends a command to check a state of gas cock closing to the mobile terminal of a sales staff. The command to check the state of gas cock closing is given from a server 101 after application data for gas cock closing from a customer is inputted into the server 101 by a key puncher or the like. A sales staff to be in charge of the checking of the state of gas cock closing is determined based on the application data for the gas cock opening from the customer.

The receiving part 132 receives a result of the state of gas cock closing sent by the sales staff from the mobile terminal 105. When the state of gas cock closing is one of move-out cock closing, unpaid bill cock closing, disconnection (requiring gas cock closing), or visiting follow-up (safety cock closing), determination is made that a gas cock closing condition is satisfied. The determination result is sent to the mobile terminal of the sales staff.

The updating part 133 receives data read from a two-dimensional barcode attached to a meter, the data being read by the sales staff with the mobile terminal 105. The sales staff reads the two-dimensional bar code attached to the meter by using the mobile terminal 105 to perform bill calculation. The read two-dimensional barcode data includes, for example, a meter company number. Moreover, a consumer code can be linked to the meter company number. The read two-dimensional barcode data is sent to the server 101. Performing data input for bill calculation data by using the two-dimensional barcode which is attached to the meter and which is sent to the server 101 can link the inputted bill calculation data to the consumer code.

The processing part 134 performs the bill calculation based on the data read by the mobile terminal 105 and received by the updating part 133.

The first print outputting part 135 sends, to the mobile terminal 105, a print instruction of instruction breakdown data generated by the processing part 134 by the bill calculation.

The registering part 136 registers information on a new address of a consumer. The information on the new address is linked to a customer code based on the consumer code which can be read from the two-dimensional barcode attached to the meter. Although not illustrated, when the state of gas cock closing is the disconnection (requiring gas cock closing), switching to disconnection input is performed.

The second print outputting part 137 creates gas cock closing form data used to print a document required for the gas cock closing, and sends a print instruction to the mobile terminal 105.

As described above, cooperation of the parts 131 to 137 of the server 101 and the mobile terminal 105 allows the sales staff to promptly handle all work related to the gas cock closing with only the mobile terminal.

[Operation of Server]

An operation of a system including the server 101 in the embodiment of the present invention is described below with reference to the drawings. Contents displayed on the screen of the mobile terminal in the drawings are displayed in the case where the state of gas cock closing is the move-out cock closing, unless otherwise noted.

The command to check the state of gas cock closing is given from the server 101 after the application data for the gas cock opening from the customer is inputted to the server 101 by the keypuncher or the like.

Figure 14:
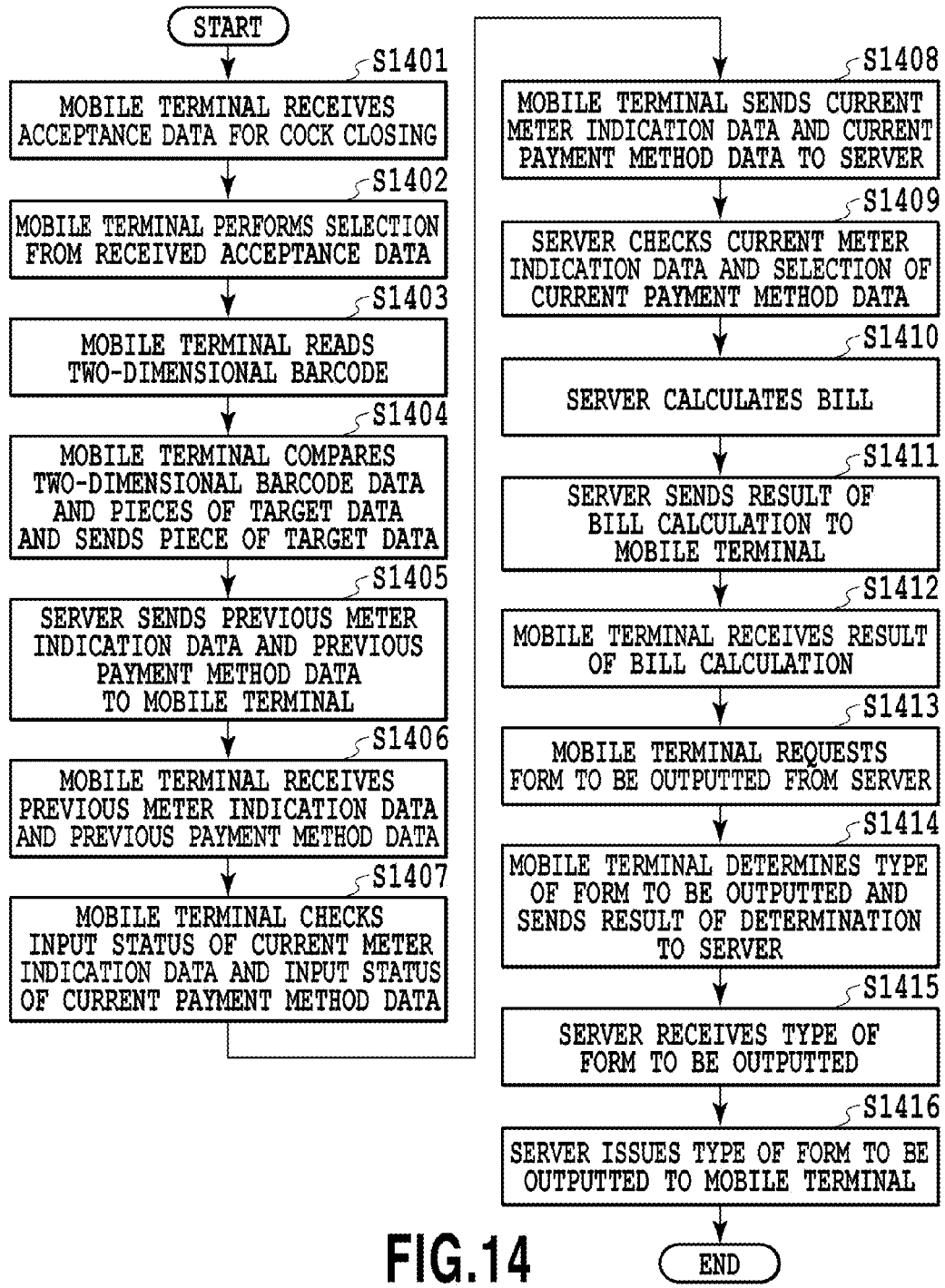
FIG. 14 is a flowchart showing an overall operation example of the server 101 in the second embodiment of the present invention.

An example of an overall operation of the system including the server 101 is now described. FIG. 14 is a flowchart showing the example of the overall operation of the system including the server 101.

First, the mobile terminal 105 receives acceptance data for the cock closing created by the server 101 (S1401), performs selection from the received acceptance data (S1402), and reads the two-dimensional barcode attached to the meter (S1403). The aforementioned acceptance data is, for example, a list including pieces of data of cock closing scheduled people who are scheduled to have the cock closed. In S1402, for example, the mobile terminal 105 selects a piece of data of a cock closing scheduled person who is to be the processing target, from the list.

Next, the mobile terminal 105 compares the two-dimensional barcode data and pieces of target data (multiple pieces data of customers) stored in a storage device of the mobile terminal 105 and sends a matching piece of target data to the server 101 (S1404).

The server 101 sends, to the mobile terminal 105, previous meter indication data of the gas meter in which the target data from the mobile terminal 105 is reflected and previous payment method data which is included in the aforementioned target data (S1405). Then, the mobile terminal 105 receives the previous meter indication data and the previous payment method data, checks input statuses of current meter indication data of the gas meter and current payment method data (for example, performs selection indicating input completion) (S1407), creates the payment method data for the meter indication data based on the check result, and sends the meter indication data and the payment method data to the server 101 (S1408). The server 101 checks whether or not the sent meter indication data is inputted and whether or not any of the payment method data is selected (S1409). The server 101 then calculates the gas bill based on the previous meter indication data and the sent meter indication data (S1410) and sends the result of bill calculation to the mobile terminal 105 (S1411). The mobile terminal 105 receives the result of bill calculation (S1412) and requests a form related to the gas cock closing from the server 101 based on the received result of bill calculation (S1413). Furthermore, the mobile terminal 105 determines a type of form and sends the result of this determination to the server 101 (S1414). Upon receiving this transmission (S1415), the server 101 issues a form corresponding to the request from the mobile terminal 105, to the mobile terminal 105 (S1416). Types of forms include supply disconnection and the like. Note that it is possible to employ a configuration in which the types of forms are set in advance and the server 101 generates and issues a predetermined form without receiving specification of the type of form from the mobile terminal 105.

Figure 15:
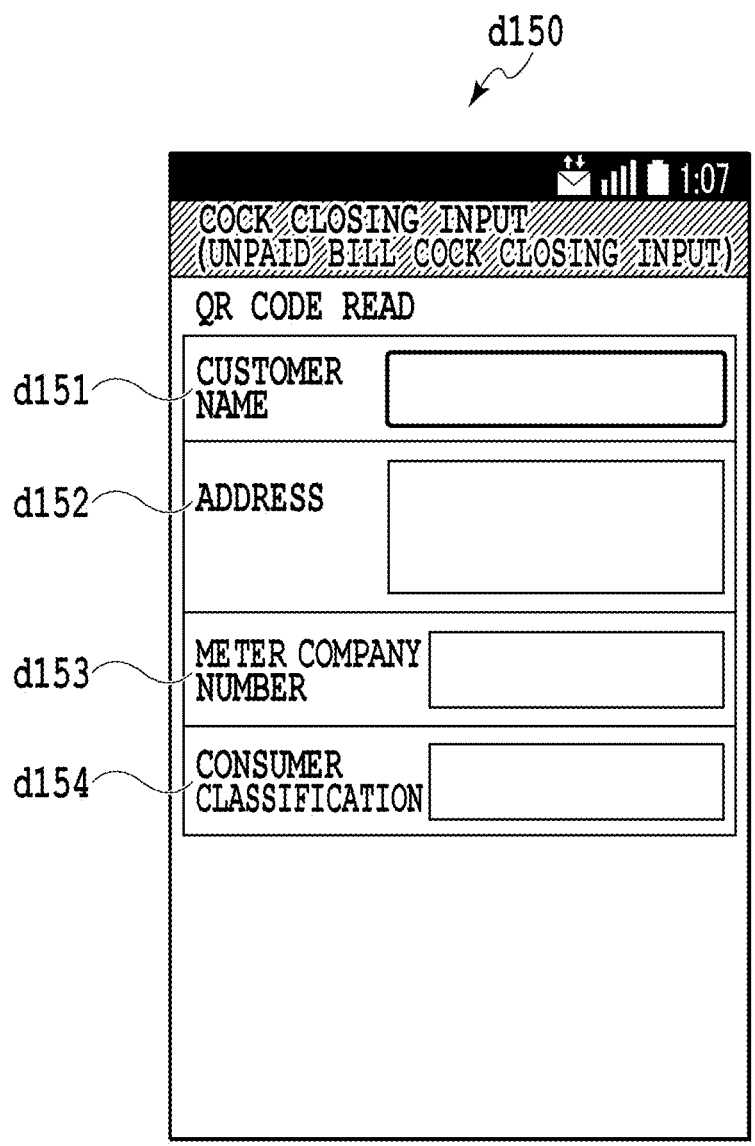
FIG. 15 is a view showing an example of an operation screen of a mobile terminal 105 before and after reading of a two-dimensional barcode in the second embodiment of the present invention.
Figure 16:
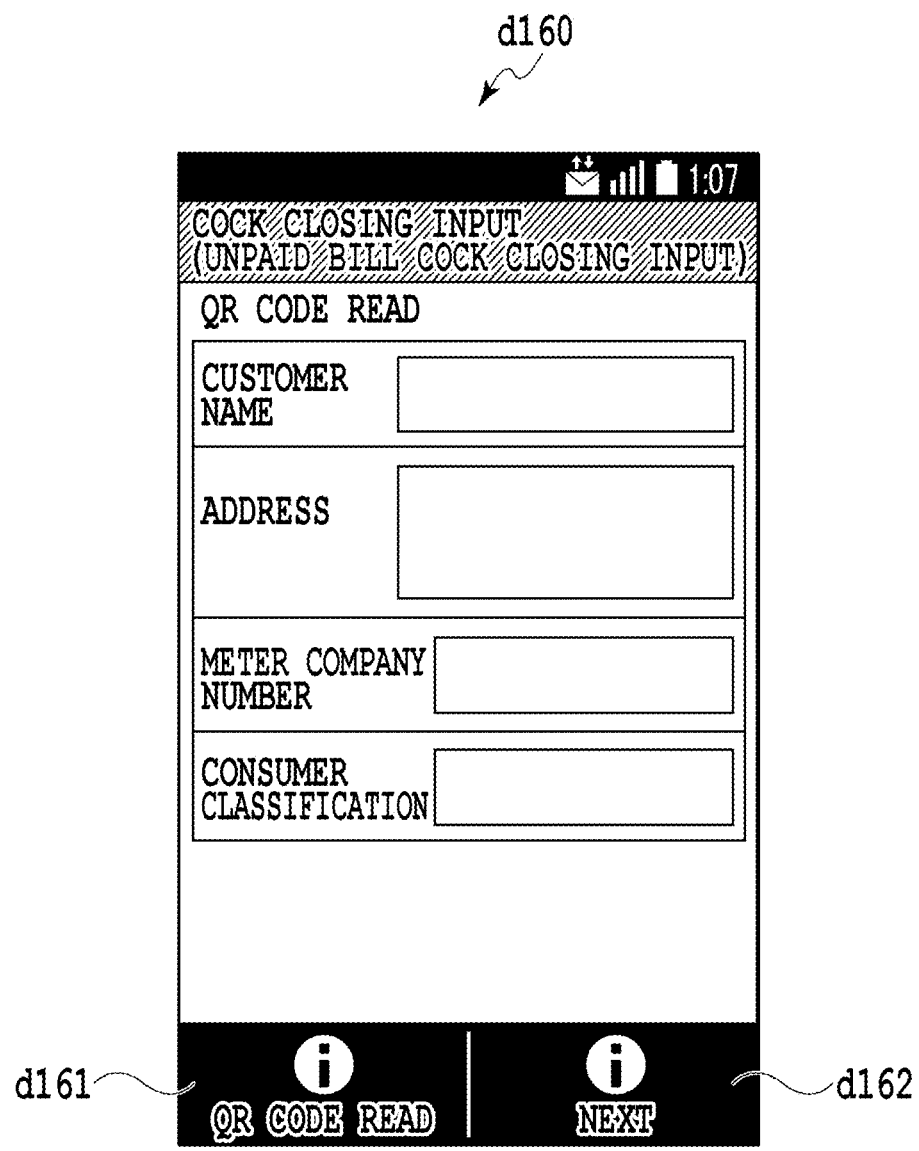
FIG. 16 is a view showing an example of the operation screen of the mobile terminal 105 before and after the reading of the two-dimensional barcode in the second embodiment of the present invention.
Figure 17:
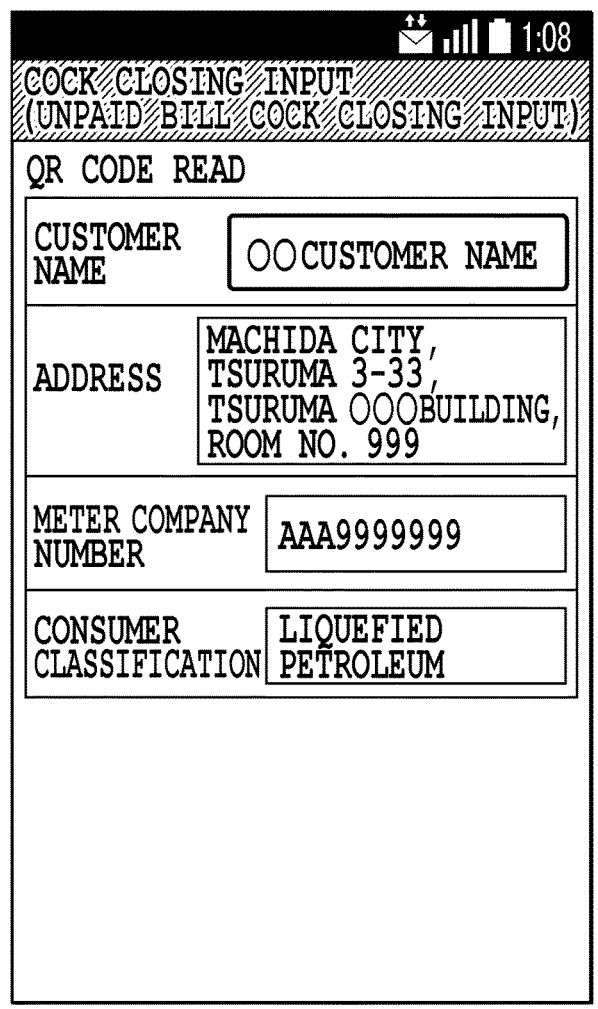
FIG. 17 is a view showing an example of the operation screen of the mobile terminal 105 before and after the reading of the two-dimensional barcode in the second embodiment of the present invention.
Figure 18:
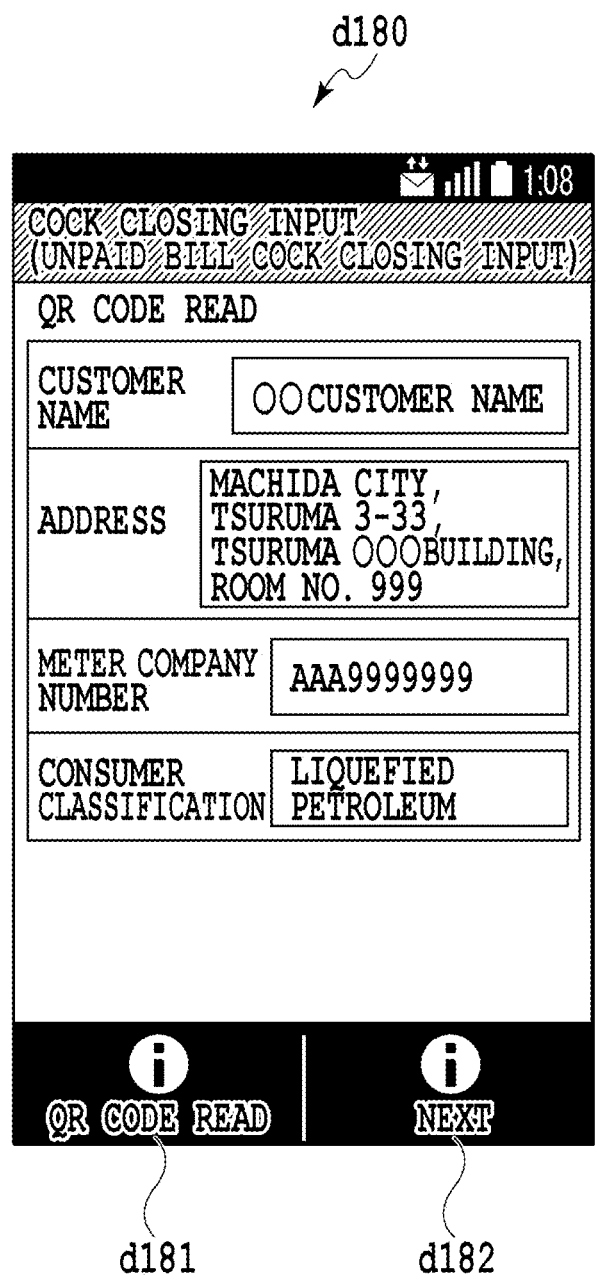
FIG. 18 is a view showing an example of the operation screen of the mobile terminal 105 before and after the reading of the two-dimensional barcode in the second embodiment of the present invention.

FIGS. 15 to 18 show examples of an operation screen of the mobile terminal 105 after and before the reading of the two-dimensional barcode. The screen is the same as that shown in FIGS. 4 to 7 in the first embodiment. FIG. 15 shows an example d150 of the operation screen of the mobile terminal 105 before the reading of the two-dimensional barcode attached to the meter, and FIG. 16 shows an example d160 of the operation screen of the mobile terminal 105 before the reading of the two-dimensional barcode attached to the meter. FIG. 17 shows an example d170 of the operation screen of the mobile terminal 105 after the reading of the two-dimensional barcode attached to the meter, and FIG. 18 shows an example d180 of the operation screen of the mobile terminal 105 after the reading of the two-dimensional barcode attached to the meter. FIGS. 15 and 17 each show an example of the screen before pressing of a menu button of the mobile terminal 105, and FIGS. 16 and 18 each show an example of the screen after the pressing of the menu button of the mobile terminal 105. The operation screen d160 of the mobile terminal 105 shown in FIG. 16 includes, for example, a "QR code (registered trademark) read" button d161 and a "next" button d162. The operation screen d180 of the mobile terminal 105 shown in FIG. 18 includes, for example, a "QR code (registered trademark) read" button d181 and a "next" button d182.

As shown in FIGS. 15 to 18, the operation screen displayed in the case of the reading of the two-dimensional barcode attached to the meter includes, for example, a "customer name" d151, an "address" d152, a "meter company number" d153, a "consumer classification" d154, and the like. The "address" d152, the "meter company number" d153, and the "consumer classification" d154 can be linked to the consumer code stored in the storage device 207 of the server 101 by the reading of the two-dimensional barcode attached to the meter. For example, when the sales staff reads the two-dimensional barcode attached to the meter, the sales staff can cause the operation screen to switch to a "gas cock closing input (bill information)" screen by pressing, for example, the "next" button d182 (see FIGS. 19 to 21).

Figure 19:
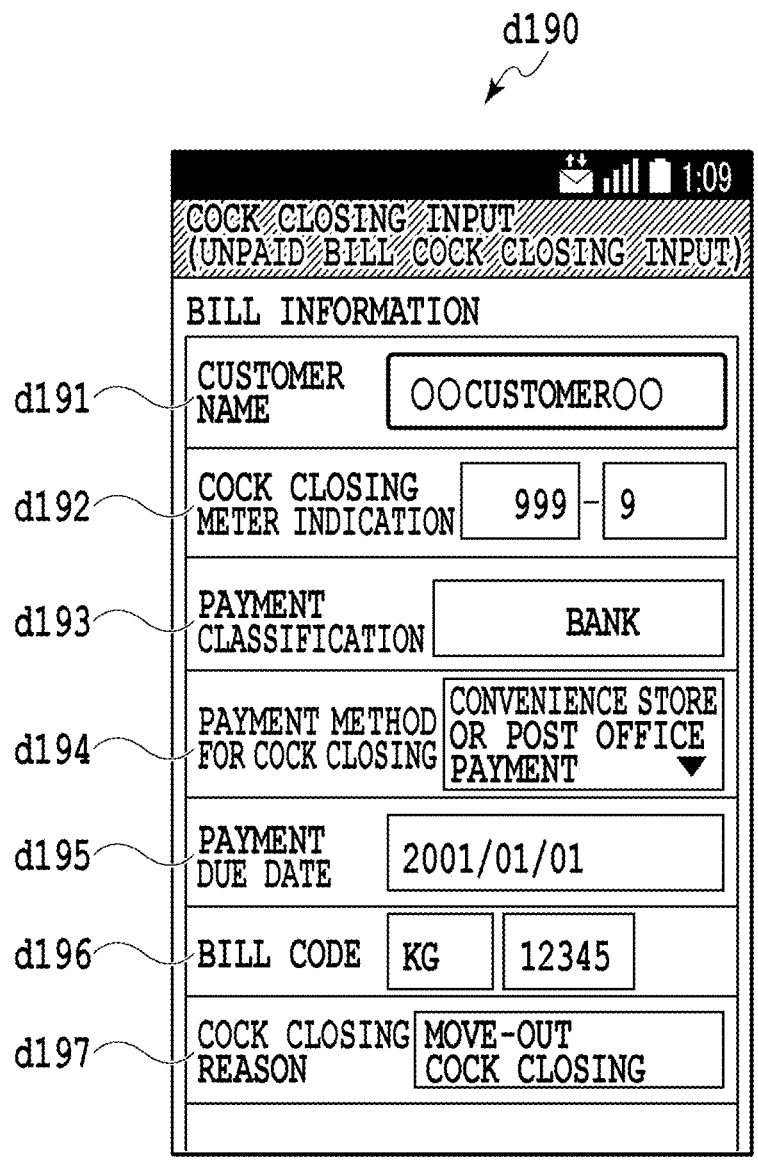
FIG. 19 is a view showing an example of a display screen of the mobile terminal 105 in bill calculation in the second embodiment of the present invention.
Figure 20:
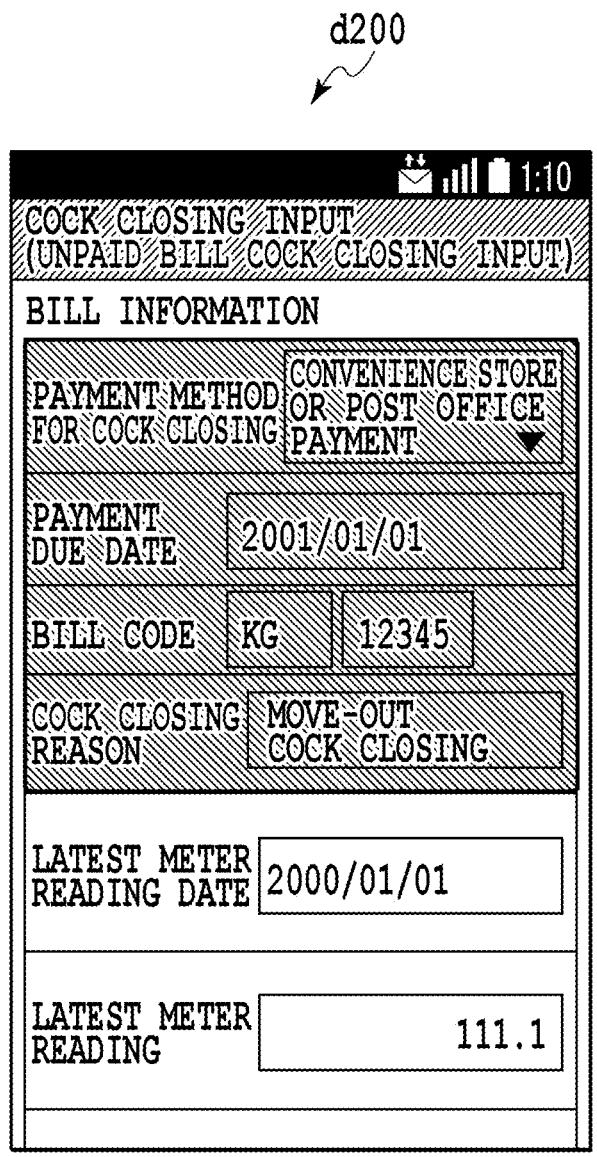
FIG. 20 is a view showing an example of a display screen of the mobile terminal 105 in the bill calculation in the second embodiment of the present invention.
Figure 21:
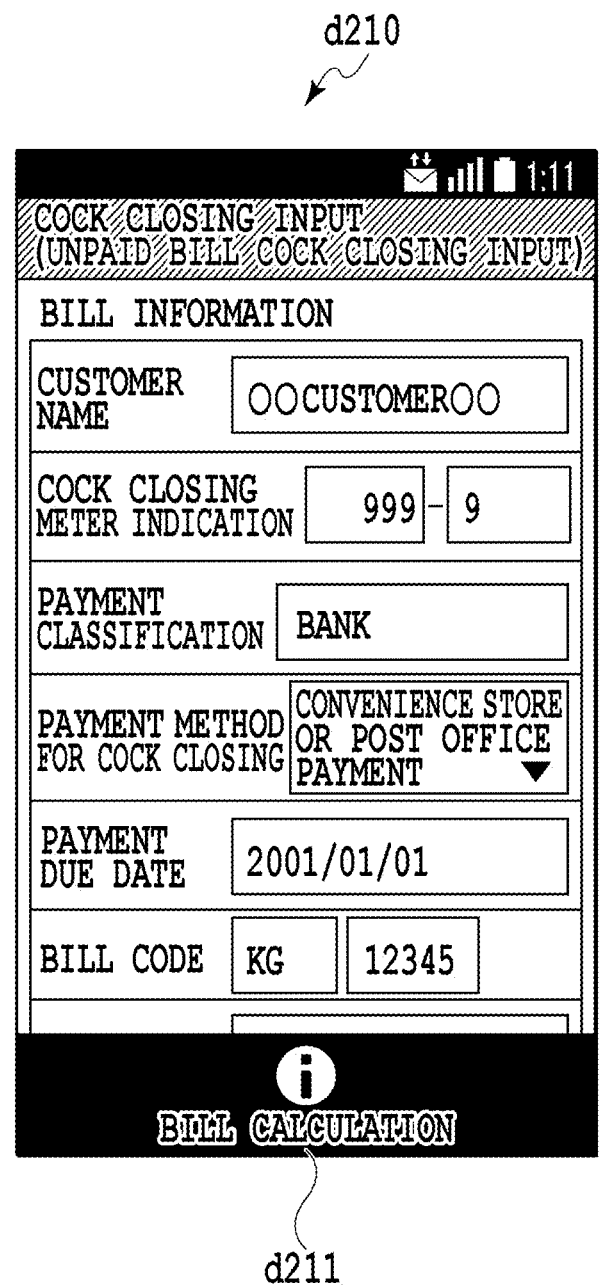
FIG. 21 is a view showing an example of the display screen of the mobile terminal 105 in the bill calculation in the second embodiment of the present invention.

FIGS. 19 to 21 each show an example of a display screen of the mobile terminal 105 in the bill calculation. FIG. 19 shows an example d190 of the screen before the pressing of the menu button of the mobile terminal 105 and before scrolling, FIG. 20 shows an example d200 of the screen before the pressing of the menu button of the mobile terminal 105 and after scrolling toward a lower side of the screen, and FIG. 21 shows an example d210 of the screen after the pressing of the menu button of the mobile terminal 105.

The processing part 134 of the server 101 performs calculation based on the bill information and the data which is read by the mobile terminal 105 and which is received by the updating part 133. As shown in FIGS. 19 to 21, the operation screen of the mobile terminal 105 displayed in the case of the bill calculation includes, for example, a "customer name" d191, a "gas cock closing meter indication" d192, a "payment classification" d193, a "payment method for gas cock closing" d194, a "payment due date" d195, a "bill code" d196, a "gas cock closing reason" d197, and the like. The move-out cock closing, the unpaid bill cock closing, or the safety cock closing is displayed in the item of the "gas cock closing reason" d197. The "bill code" d196 can be linked to the consumer code included in the reception information data stored in the storage device 207 of the server 101 by the reading of the two-dimensional barcode attached to the meter. When the sales staff presses a "bill calculation" button d211 on the display screen of the mobile terminal 105, the processing part 134 of the server 101 performs processing for the bill calculation (see FIGS. 22 to 25).

The bill based on a gas usage can be calculated by performing meter reading processing. For example, in the meter reading processing, the gas usage in a period from a previous meter reading date to a current meter reading date is obtained from a formula of {(meter indication at the previous meter reading date)−(meter indication at the current meter reading date)}. After obtaining this gas usage, the processing part 134 calculates a "gas bill of the customer for the meter reading of this month" according to a predetermined calculation formula (for example, (basic bill)+(unit bill)×(gas usage)). In other words, the gas bill of the customer for the month of meter reading is, for example, a gas bill for the gas usage in a period from the previous meter reading date to the current meter reading date. Note that the aforementioned calculation method of gas bill is not limited to the above example, and the gas bill can be calculated from various perspectives.

Figure 23:
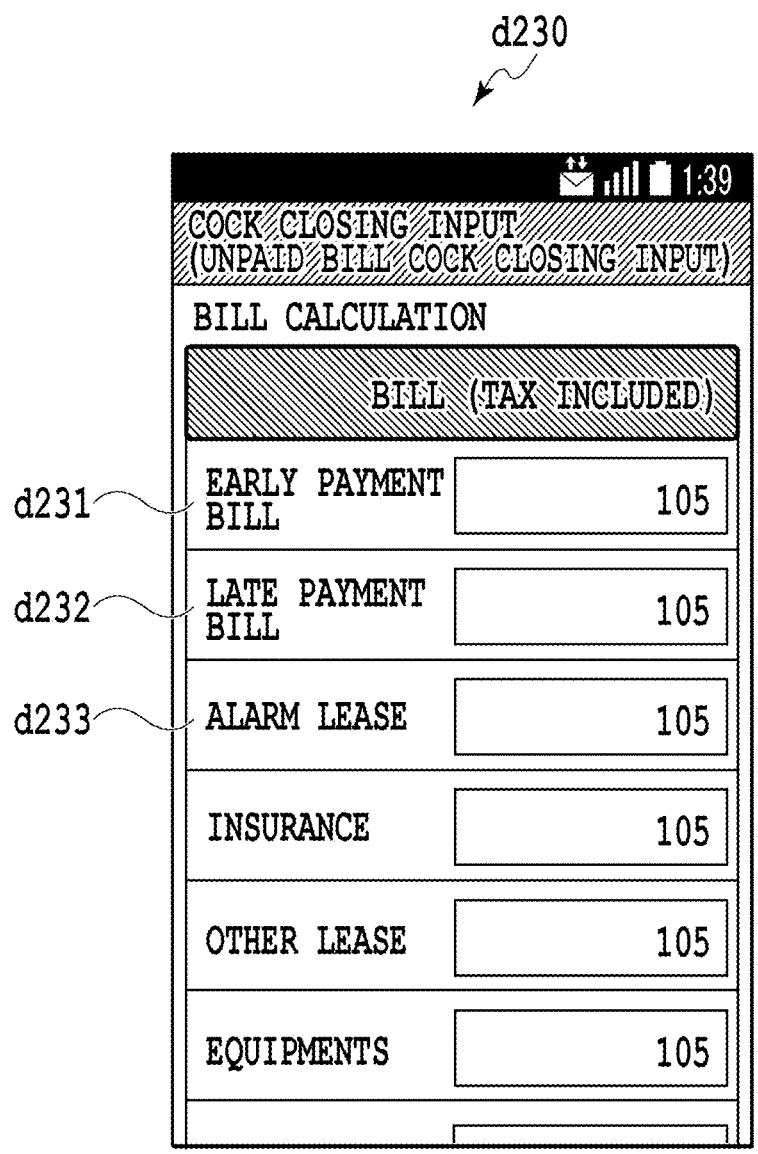
FIG. 23 is a view showing an example of the display screen of the mobile terminal 105 in the breakdown of the bill calculation in the second embodiment of the present invention.
Figure 24:
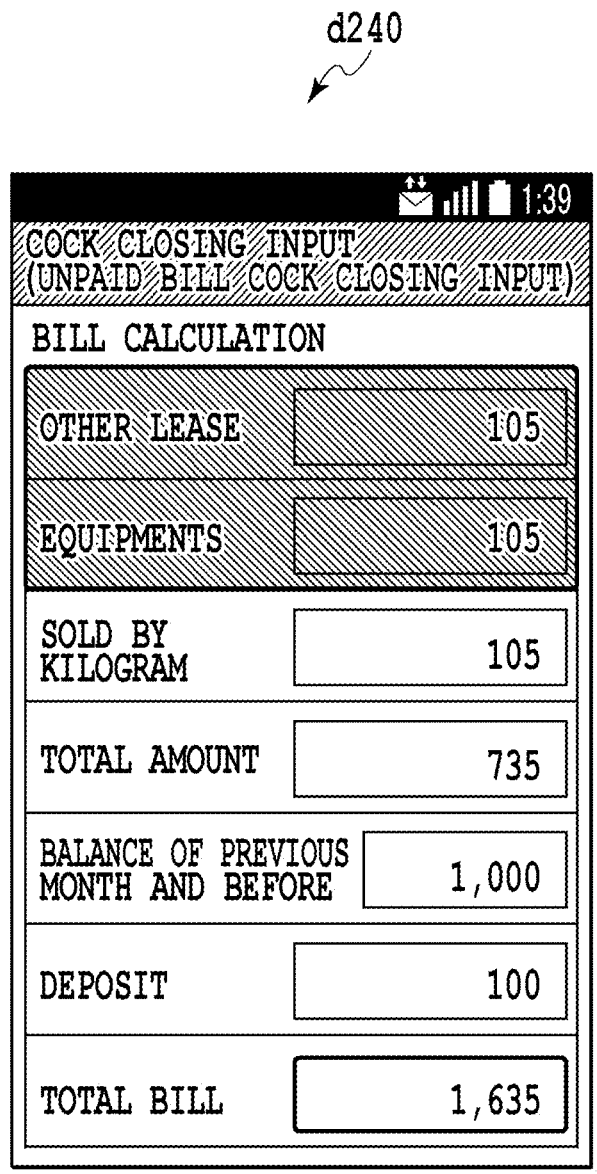
FIG. 24 is a view showing an example of the display screen of the mobile terminal 105 in the breakdown of the bill calculation in the second embodiment of the present invention.
Figure 25:
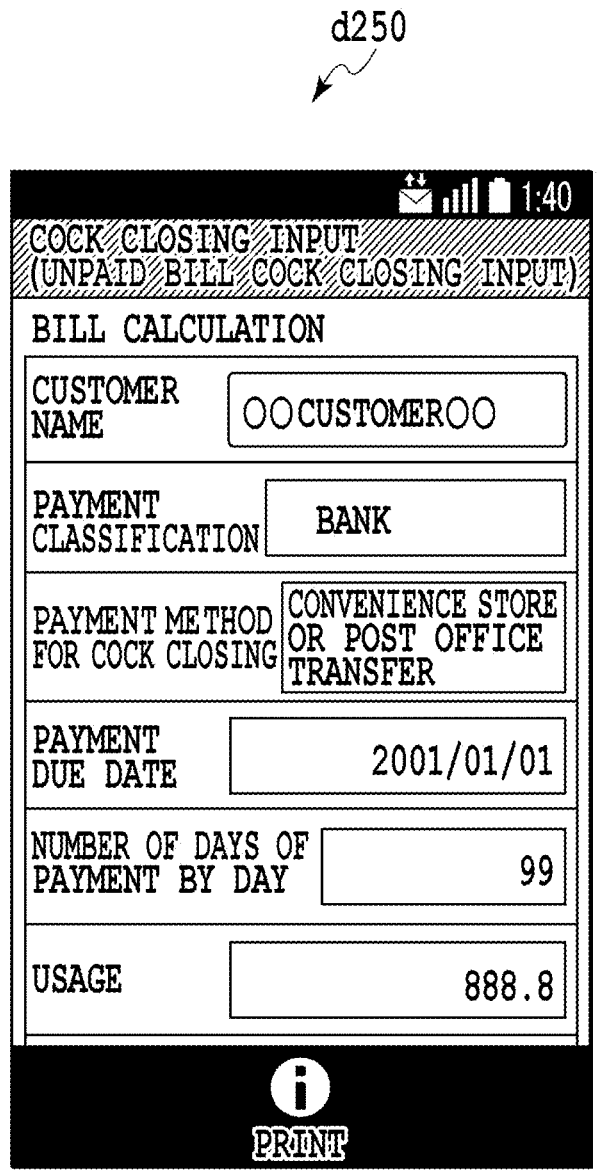
FIG. 25 is a view showing an example of the display screen of the mobile terminal 105 in the breakdown of the bill calculation in the second embodiment of the present invention.

FIG. 22 of 25 each show an example of the display screen of the mobile terminal 105 in which a breakdown of the bill calculation is displayed. FIG. 22 shows an example d220 of the screen before the pressing of the menu button of the mobile terminal 105 and before scrolling, FIG. 23 shows an example d230 of the screen before the pressing of the menu button of the mobile terminal 105 and after downward scrolling by one screen, FIG. 24 shows an example of the screen before the pressing of the menu button of the mobile terminal 105 and after further downward scrolling from the screen shown in FIG. 23, and FIG. 25 shows an example d250 of the screen after the pressing of the menu button of the mobile terminal 105.

The first print outputting part 135 of the server 101 sends the print instruction of the instruction breakdown data generated by the bill calculation in the processing part 134, to the mobile terminal 105. The sales staff operates the mobile terminal 105 upon receiving the print instruction and causes a print outputting device to print the instruction breakdown data. As shown in FIGS. 22 to 25, the display screen for the instruction breakdown of the bill calculation includes, for example, a "customer name" d221, a "number of days of payment by the day" d222, a "usage" d223, an "early payment bill" d231, a "late payment bill" d232, an "alarm release" d233, and the like.

As described above, automatic creation of the data required for the cock closing allows the sales staff to perform input of the data required for the cock closing and printing of the gas cock closing form on the site by using the mobile terminal.

Although the embodiments are described above, specific data structures and the like are not limited to those in the embodiments and may be changed.

The invention claimed is:

1. A gas cock opening management system for installing a gas meter and a gas cylinder including a gas cock to open the gas cock in order to supply gas from the gas cylinder to a consumer through a pipeline, the gas cock opening management system comprises the gas cylinder, a server and a mobile terminal, wherein the mobile terminal is configured to:
receive acceptance data for gas cock opening created by the server, the acceptance data includes customer data of customers scheduled to have the gas cock opened,
store the customer data in a storage device of the mobile terminal,
compare two-dimensional barcode data generated by reading a two-dimensional barcode attached to the gas meter and the customer data stored in the storage device, and
if the two-dimensional barcode data and the stored customer data are matched as a result of the comparison, send the customer data to the server, wherein the server is configured to:
in response to the customer data sent from the mobile terminal, obtain an inspection item relating to the gas cock opening based on a gas meter number indicated by the received customer data, and
send the inspection item to the mobile terminal, wherein the mobile terminal is further configured to:
receive the inspection item relating to the gas cock opening,
obtain an inspection result item indicating a result of the inspection item, and
send the inspection result item to the server, wherein the server is further configured to:
determine the received inspection result item, and
send a permission for the gas cock opening to the mobile terminal if the determination result for the inspection result item fulfills predefined requirements, wherein the mobile terminal is further configured to display the permission for the gas cock opening on a display screen of the mobile terminal, and wherein the gas cock of the gas cylinder is configured to be opened in response to the displaying of the permission for the gas cock opening.

2. A gas cock closing management system for closing a gas cock in order to conduct a gas supply disconnection from a gas cylinder including the gas cock to a consumer through a pipeline, the gas cock closing management system comprises the gas cylinder, a server, and a mobile terminal, wherein the communication terminal is configured to:
receive acceptance data for gas cock closing created by the server, the acceptance data includes customer data of customers scheduled to have the gas cock closed,
store the customer data in a storage device of the mobile terminal,
compare two-dimensional barcode data generated by reading a two-dimensional barcode attached to the gas meter and the customer data stored in the storage device, and
if the two-dimensional barcode data and the stored customer data are matched as a result of the comparison, send the customer data to the server, wherein the server is configured to:
in response to the customer data sent from the mobile terminal, perform bill calculation based on a previous meter indication data in a gas meter corresponding to a gas meter number indicated by the received customer data and current meter indication data sent from the mobile terminal, and
send a result of the bill calculation to the communication terminal, wherein the mobile terminal is further configured to:
send a request including a type of form relating to the gas cock closing based on the received result of the bill calculation, wherein the server is further configured to:
in response to the received request, obtain a predetermined form, and
send the predetermined form to the mobile terminal, wherein the mobile terminal is further configured to display the predetermined form on a display screen of the mobile terminal, and wherein the gas cock of the gas cylinder is configured to be closed in response to the displaying of the predetermined form.

* * * * *